United States Patent
Wong et al.

(10) Patent No.: US 9,213,379 B2
(45) Date of Patent: Dec. 15, 2015

(54) DISTRIBUTED FAN CONTROL

(71) Applicant: NVIDIA Corporation, Santa Clara, CA (US)

(72) Inventors: Kevin Wong, San Jose, CA (US);
Thomas Dewey, Menlo Park, CA (US);
Craig Ross, Santa Clara, CA (US);
Andrew Bell, San Francisco, CA (US);
John Lam, Milpitas, CA (US); Gabriele Gorla, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 30 days.

(21) Appl. No.: 14/056,781

(22) Filed: Oct. 17, 2013

(65) Prior Publication Data

US 2015/0108934 A1    Apr. 23, 2015

(51) Int. Cl.
*G06F 1/20* (2006.01)
*F04D 27/00* (2006.01)
*F04D 25/06* (2006.01)

(52) U.S. Cl.
CPC ............ *G06F 1/206* (2013.01); *F04D 25/0613* (2013.01); *F04D 27/004* (2013.01)

(58) Field of Classification Search
CPC .................................................. H05K 7/20209
See application file for complete search history.

(56) References Cited

U.S. PATENT DOCUMENTS

| | | | | |
|---|---|---|---|---|
| 6,778,938 | B1 * | 8/2004 | Ng et al. | 702/147 |
| 7,219,027 | B1 * | 5/2007 | Lee et al. | 702/79 |
| 7,479,753 | B1 | 1/2009 | Mimberg | |
| 8,280,559 | B2 * | 10/2012 | Herman | G05D 23/19 165/247 |
| 2004/0027799 | A1 * | 2/2004 | King et al. | 361/687 |
| 2006/0186846 | A1 * | 8/2006 | Lassen | 318/439 |
| 2008/0317444 | A1 * | 12/2008 | Hsu et al. | 388/811 |
| 2009/0261768 | A1 * | 10/2009 | Li et al. | 318/471 |
| 2010/0054964 | A1 * | 3/2010 | Teng et al. | 417/326 |
| 2010/0066279 | A1 * | 3/2010 | Frankel et al. | 318/379 |
| 2011/0002098 | A1 * | 1/2011 | Xu | 361/679.46 |
| 2012/0265363 | A1 * | 10/2012 | Hung et al. | 700/300 |

* cited by examiner

*Primary Examiner* — Eduardo Colon Santana
*Assistant Examiner* — Cortez Cook
(74) *Attorney, Agent, or Firm* — Billion & Armitage; Michael A. Collins

(57) ABSTRACT

A device for processing graphics data may include a plurality of graphics processing units. The device may include a fan to dissipate thermal energy generated during the operation of the plurality of graphics processing units. Each of the plurality of graphics processing units may generate a pulse width modulated signal to control the speed of the fan. The device may include one or more monitoring units configured to monitor a signal controlling the speed of the fan. One or more of the plurality of pulse width modulated signals may be adjusted based on the monitored signal. One or more of the plurality of pulse width modulated signals may be adjusted such that a signal controlling the fan maintains a desired duty cycle.

19 Claims, 7 Drawing Sheets

DISTRIBUTED FAN CONTROL

TECHNICAL FIELD

This disclosure relates to systems and methods for thermal management and, more particularly, to controlling a fan associated with a graphics processing unit.

BACKGROUND

Devices including laptop or desktop computers, tablet computers, digital video recorders, set-top boxes, digital media players, video gaming devices, and video game consoles may include a graphics subsystem including one or more graphics processing units (GPUs). One or more GPUs may be implemented on a single graphics card. During operation, the one or more GPUs may generate a significant quantity of thermal energy. If the thermal energy is not dissipated, performance of the one or more GPUs may degrade.

A graphics card may include a fan to dissipate heat during the operation of the one or more GPUs. The speed at which a fan rotates and thus the rate at which heat is dissipated may be controlled by one or more GPUs. Acoustic noise may be generated as the fan rotates. The amount of acoustic noise perceived by a user may be based on the speed at which the fan rotates and/or how frequently the fan is rotating at a particular speed. Current techniques for controlling the speed of a fan may be inadequate for dissipating heat and/or may be detrimental to the user's experience.

SUMMARY

In general, this disclosure describes techniques for controlling the speed of a fan used to dissipate thermal energy during the operation of a graphics processing unit. In particular, this disclosure describes techniques for controlling the speed of a fan based on respective fan control signals generated from one or more graphics processing units (GPUs). It should be noted that although the techniques of this disclosure are described with respect to examples for dissipating thermal energy associated with the operation of GPUs, the techniques described herein are equally applicable to dissipating thermal energy in other environments. For example, a fan may be used to dissipate thermal energy generated during the operation of other components associated with a computing device, such as, for example, CPUs, memory controllers, and modems and the techniques described herein may be used to dissipate thermal energy associated with the operation of these components.

According to one example of the disclosure, a method for controlling the speed of a fan associated with a graphics processing subsystem comprises monitoring a plurality of fan control signals, generating a signal having a duty cycle equal to the maximum duty cycle of the plurality of fan control signals, and driving the fan using the generated signal.

According to another example of the disclosure an apparatus for controlling the speed of a fan associated with a graphics processing subsystem comprises means for monitoring a plurality of fan control signals, means for generating a signal having a duty cycle equal to the maximum duty cycle of the plurality of fan control signals, and means for driving the fan using the generated signal.

According to another example of the disclosure a non-transitory computer-readable storage medium has instructions stored thereon that upon execution cause one or more processors of a device to monitor a plurality of fan control signals, generate a signal having a duty cycle equal to the maximum duty cycle of the plurality of fan control signals, and drive the fan using the generated signal.

According to another example of the disclosure a method for controlling the speed of a fan associated with a graphics processing subsystem comprises monitoring a signal driving a fan, comparing the signal driving the fan to a defined period and a defined duty cycle of a generated fan control signal, determining whether an assertion time of the signal driving the fan is greater than an assertion time of the generated fan control signal, and adjusting the generated fan control signal based on whether the assertion time of the signal driving the fan is greater than the assertion time of the generated fan control signal.

According to another example of the disclosure a device for processing graphics data, the device comprises a fan, a plurality of graphics processing units configured to generate a fan control signal based on a defined period and a defined duty cycle, monitor a signal driving the fan, and adjust the generated fan control signal based on the signal driving the fan to maintain the defined duty cycle.

The details of one or more examples are set forth in the accompanying drawings and the description below. Other features, objects, and advantages will be apparent from the description and drawings, and from the claims.

DETAILED DESCRIPTION

Figure 1:
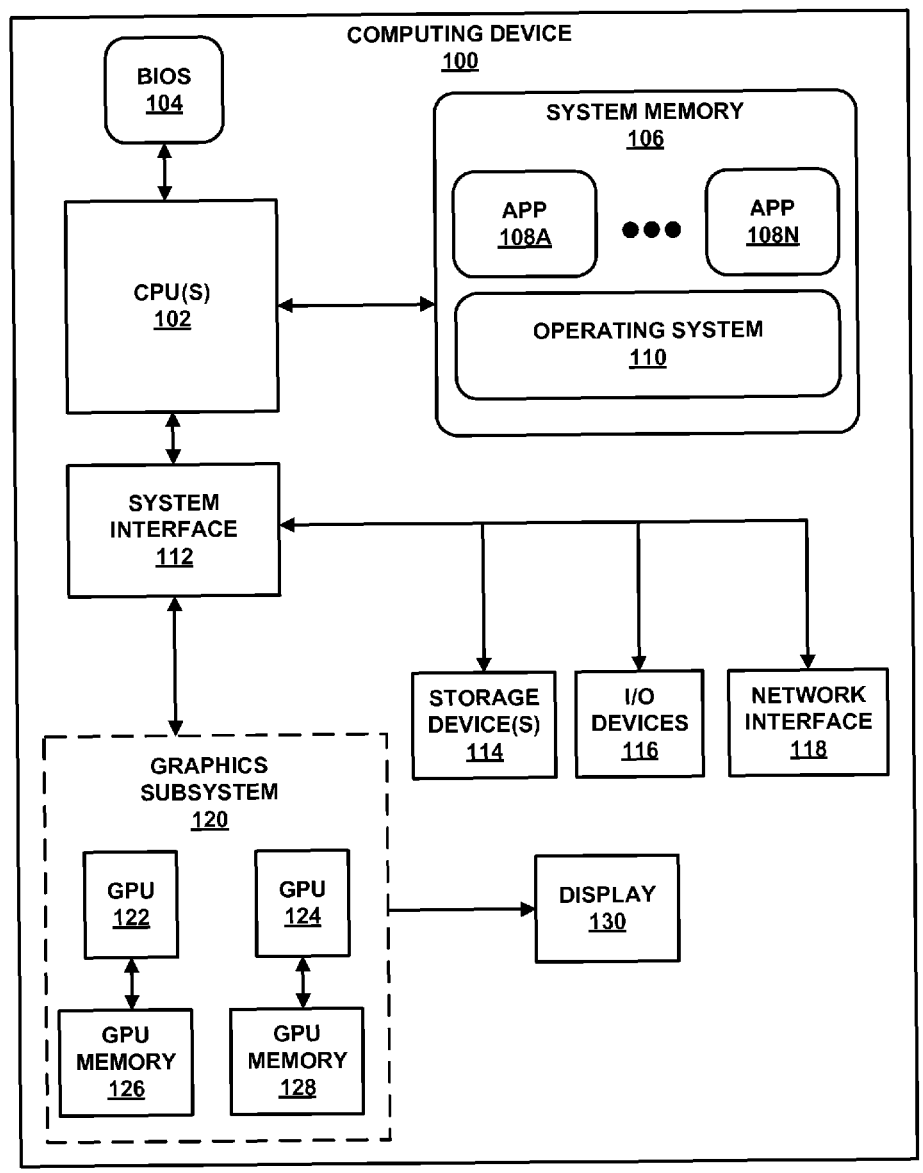
FIG. 1 is a block diagram illustrating an example of a computing device that may implement one or more techniques of this disclosure.

Devices including laptop or desktop computers, tablet computers, digital video recorders, set-top boxes, digital media players, video gaming devices, video game consoles, and cellular telephones may include a graphics subsystem including one or more graphics processing units (GPUs). In some cases, one or more GPUs may be implemented on a single graphics card and the graphics card may include a fan for dissipating thermal energy. In some cases, a GPU controls the speed of a fan as part of the graphics card's thermal management. The speed of a fan may be determined by the duty cycle of a pulse width modulated (PWM) signal generated by a GPU. For example, the higher the duty cycle of the PWM signal, the faster the fan may spin. Commonly assigned U.S. Pat. No. 7,479,753, which is incorporated by reference in its entirety, describes examples of how a PWM signal may be used to control the speed of a fan. It should be noted that the term duty cycle as used herein may refer to the desired amount of time to drive a fan (i.e., assertion time) divided by the desired time of a waveform period. For example, duty cycle may be defined according to the following equations:

period: desired number of clock cycles of the PWM waveform period  (1)

high (hi): desired number of clock cycles to drive the PWM to spin the fan  (2)

duty cycle=hi/period  (3)

It should be noted that although the techniques described herein are described according to examples where a fan is controlled using a signal having active low polarity (i.e., the fan is ON when a PWM signal is low), the techniques described herein are equally applicable to examples where a fan is controlled using a signal having active high polarity.

During periods where a GPU or cores thereof are reset or powered off (e.g., cold boot or low power state), a GPU may be unable to generate a PWM signal to control fan speed. In some implementations it is possible to add a pull resistor on the PWM signal to configure the fan to spin at full speed when a GPU is unable to generate a PWM signal. However, the acoustic noise caused by the fan spinning at full speed for an extended period of time may not provide for a good user experience. As an alternative to adding a pull resistor, more complex circuits (e.g., astable multi-vibrator) may be added to the board design of the graphic card to generate a fixed duty cycle PWM when a GPU configured to generate a controlling PWM signal is reset or powered off. Although this may reduce the amount of acoustic noise, adding additional components to a board may add to the bill of materials (BOM) cost and may take up area on a board that may be used for other components.

Additionally, complexities may arise in board designs of graphics cards where two or more GPUs share the same fan. That is, if each of multiple GPUs generates a PWM signal independent of the other GPUs, it may be difficult to combine all of the PWM signals into a single PWM signal that spins the fan at the desired speed. Further, in some examples, when there are two GPU's driving a single fan, each GPU typically drives the fan with a duty cycle based on its internal temperature and thermal thresholds. Thus, in some cases, a GPU that is over its thermal threshold will drive the fan with a higher duty cycle PWM control signal than a GPU below its thermal threshold. Typically, it is desirable for the fan to spin according to the PWM control signal with the higher duty cycle to achieve a faster cooling effect. One technique for combining PWM control signals from two or more GPUs is to logically AND the signals to form the fan control signal. When two PWM signals are ANDed the result is a low signal if either of the signals is low. Thus, in an active low configuration the fan will be ON if either signal is low. However, since the two PWM control signals may be asynchronous to each other, the PWM duty cycle and period may be corrupted and the fan may oscillate between different speeds, which may increase the amount of acoustic noise.

Another technique for combining two GPU PWM control signal is to designate one GPU as the "master" GPU, where the master GPU's PWM signal drives the fan. Designating one GPU as the master may require providing additional communication capabilities between GPUs for arbitrating which GPU controls the fan. Also, in order to provide a good user experience a graphics card may need to be able to transfer fan control from a master GPU to another GPU in an acoustically undetectable manner, (e.g., in the case where a master GPU wants to enter a low power state). The techniques described herein may be used to control a fan in a graphics subsystem including multiple GPUs.

FIG. 1 is a block diagram illustrating an example of a computing device that may implement one or more techniques of this disclosure. Computing device 100 may include or be part of any device configured to execute one or more applications. For example, computing device 100 may include or be part of a desktop or laptop computer, a set top box, or a personal gaming device. Computing device 100 may be equipped for wired and/or wireless communications. In one example, computing device 100 may be configured to send and receive data from a communications network.

Computing device 100 includes central processor unit(s) 102, BIOS 104, system memory 106, system interface 112, storage device(s) 114, I/O devices 116, network interface 118, graphics subsystem 120, and display 130. As illustrated in FIG. 1, system memory 106 includes applications 108A-108N and operating system 110. Further, as illustrated in FIG. 1, graphics subsystem 120 includes GPU 122, GPU 124, GPU memory 126, and GPU memory 128. It should be noted that although example computing device 100 is illustrated as having distinct functional blocks, such an illustration is for descriptive purposes and does not limit computing device 100 to a particular hardware or software architecture. Functions of computing device 100 may be realized using any combination of hardware, firmware and/or software implementations.

CPU(s) 102 may be configured to implement functionality and/or process instructions for execution in computing device 100. CPU(s) 102 may be capable of retrieving and processing instructions, code, and/or data structures for implementing one or more of the techniques described herein. Instructions may be stored on a computer readable medium, such as system memory 106 or storage devices 114. CPU(s) 102 may include digital signal processors (DSPs), general purpose microprocessors, application specific integrated circuits (ASICs), field programmable logic arrays (FPGAs), or other equivalent integrated or discrete logic circuitry. CPU(s) 102 may include multi-core central processing units. CPU(s) 102 may be configured such that dedicated graphic processing units, such as those included in graphics subsystem 120, are used for graphics processing.

BIOS (Basic Input/Output System) 104 may include a storage medium having low-level system software stored thereon. For example, BIOS 104 may include a program stored in read only memory ("ROM") or flash memory that is run whenever computing device 100 boots up and enables basic input and output functionality. Further, BIOS 104 may be configured to initialize and boot an operating system, such as, for example, operating system 110.

System memory 106 may be configured to store information that may be used by computing device 100 during operation. System memory 106 may be used to store program instructions for execution by CPU(s) 102 and may be used by software or applications running on computing device 100 to temporarily store information during program execution. For example, system memory 106 may store instructions associated with operating system 110 and applications 108A-108N. Applications 108A-108N may be any applications implemented within or executed by computing device 100 and may be implemented or contained within, operable by, executed by, and/or be operatively/communicatively coupled to components of computing device 100. Applications 108A-108N may include instructions that may cause CPU(s) 102 of computing device 100 to perform particular functions. Applications 108A-108N may include algorithms which are expressed in computer programming statements, such as, for-loops, while-loops, if-statements, do-loops, etc.

As further illustrated in FIG. 1, applications 108A-108N may execute "on top of" operating system 110. That is, operating system 110 may be configured to facilitate the interaction of applications 108A-108N with CPUs(s) 102, and other hardware components of computing device 100, such as, for example, graphics subsystem 120. Operating system 110 may be an operating system designed to be installed on laptops, desktops, smartphones, tablets, set-top boxes, and/or gaming devices. For example, operating system 110 may be a Windows®, Linux, or Mac OS, Android, iOS, Windows Mobile®, or a Windows Phone® operating system.

System memory 106 may be described as a non-transitory or tangible computer-readable storage medium. In some examples, system memory 106 may provide temporary memory and/or long-term storage. In some examples, system memory 106 or portions thereof may be described as non-volatile memory and in other examples portions of system memory 106 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories.

System interface 112 may be configured to enable communication between components of computing device 100. In one example, system interface 112 comprises structures that enable data to be transferred from one peer device to another peer device or to a storage medium. For example, system interface 112 may include a chipset supporting Accelerated Graphics Port ("AGP") based protocols, Peripheral Component Interconnect (PCI) bus based protocols, such as, for example, the PCI Express™ ("PCIe") bus specification, which is maintained by the Peripheral Component Interconnect Special Interest Group, or any other form of structure that may be used to interconnect peer devices.

Storage device(s) 114 represents memory of computing device 100 that may be configured to store relatively larger amounts of information for relatively longer periods of time than system memory 106. Similar to system memory 106, storage device(s) 114 may also include one or more non-transitory or tangible computer-readable storage media. Storage device(s) 114 may be internal or external memory devices and in some examples may include non-volatile storage elements. Examples of memory devices include file servers, an FTP servers, network attached storage (NAS) devices, a local disk drive, or any other type of device or storage medium capable of storing data. Storage medium may include Blu-ray discs, DVDs, CD-ROMs, flash memory, or any other suitable digital storage media. When the techniques described herein are implemented partially in software, a device may store instructions for the software in a suitable, non-transitory computer-readable medium and execute the instructions in hardware using one or more processors.

I/O device(s) 116 may be configured to receive input and provide output during operation of computing device 100. Input may be generated from an input device, such as, for example, touch-sensitive screen, track pad, track point, mouse, a keyboard, a microphone, video camera, or any other type of device configured to receive input. Output may be provided to output devices, such as, for example speakers or a display device. In some examples, I/O device(s) 116 may be used for basic input and output functions associated with BIOS 104. In some examples, I/O device(s) 116 may be external to computing device 100 and may be operatively coupled to computing device 100 using a standardized communication protocol, such as for example, Universal Serial Bus protocol (USB).

Network interface 118 may be configured to enable computing device 100 to communicate with external computing devices via one or more networks. Network interface 118 may be a network interface card, such as an Ethernet card, an optical transceiver, a radio frequency transceiver, or any other type of device that can send and receive information. Network interface 118 may be configured to operate according to one or more of the communication protocols associated with a packet-based network, such as a local area network, a wide-area network, or a global network such as the Internet. Examples of communication protocols include Global System Mobile Communications (GSM) standards, code division multiple access (CDMA) standards, 3rd Generation Partnership Project (3GPP) standards, Internet Protocol (IP) standards, Wireless Application Protocol (WAP) standards, and/or an IEEE standards, such as, one or more of the 802.11 standards, as well as various combinations thereof.

Display 130 may be configured to provide visual output generated during the operation of computing device 100. For example, display 130 may include a cathode ray tube (CRT) monitor, a liquid crystal display (LCD), or any other type of device that can provide output. In some examples, display 130 may be an integrated display. In the example where computing device 100 is a mobile device, display 130 may be an integrated touch-screen display. For example, display 130 may be an organic light emitting diode (OLED) display configured to receive user touch inputs, such as, for example, taps, drags, and pinches. In other examples, display 130 may be an external display device coupled to computing device 100 using a standardized communication protocol, such as, for example, High-Definition Multimedia Interface (HDMI), Digital Visual Interface (DVI), DisplayPort, and Video Graphic Array (VGA).

Graphics subsystem 120 may be configured to receive commands and data and output pixel data. Graphics subsystem 120 may be configured to output pixel data to display 130 according a standardized communication protocol (e.g., HDMI, DVI, DisplayPort, and/or VGA). In the example illustrated in FIG. 1, graphics subsystem 120 includes graphics processing unit 122 and graphic processing unit 124. It should be noted that in other examples, graphics subsystem 120 may include more than two graphic processing units. Graphics processing unit 122 and graphic processing unit 124 may include multiple processing cores. Graphics processing unit 122 and graphic processing unit 124 may perform graphics processing associated with the execution of applications 108A-108N.

Graphics processing unit 122 and graphic processing unit 124 may be configured to operate according to an application programming interface, such as, for example, OpenGL (Open Graphics Library, managed by the Khronos Group) and/or Direct3D (managed by Microsoft, Inc.), both of which are incorporated by reference herein in their respective entirety. Graphics processing unit 122 and graphic processing unit 124 may operate according to a graphics pipeline process (e.g., input assembler, vertex shader, geometry shader, rasterizer, pixel shader, and output merger). Each of graphics processing unit 122 and graphic processing unit 124 may have primary display and 3D rendering capabilities. Graphics processing unit memory 126 and graphics processing unit memory 128 may include storage mediums configured to store data generated during a graphics pipeline process. For example, graphics processing unit memory 126 and graphics processing unit memory 128 may include frame buffers. Further, graphics processing unit memory 126 and graphics processing unit memory 128 may store instructions that are executed by graphics processing unit 122 and graphic processing unit 124.

Figure 2:
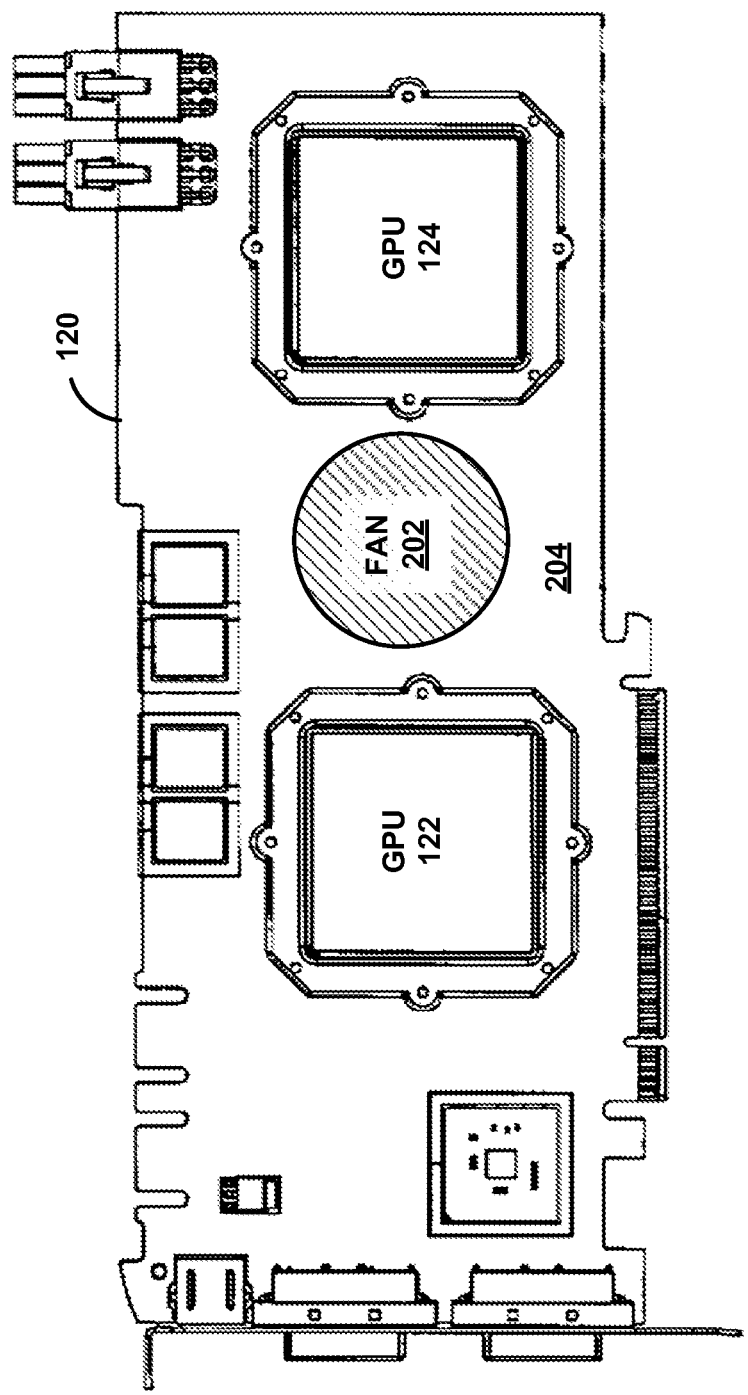
FIG. 2 is a conceptual diagram illustrating an example of a graphics subsystem in accordance with one or more techniques of this disclosure.

As described above, one or more GPUs may be implemented on a single graphics card and the graphics card may include a fan for dissipating thermal energy. FIG. 2 is a conceptual diagram illustrating an example of a graphics subsystem in accordance with one or more techniques of this disclosure. FIG. 2 illustrates an example where graphic subsystem 120 includes a graphic card where graphics processing unit 122 and graphics processing unit 124 are operably coupled to circuit board 204. Further, in the example illustrated in FIG. 2, graphics subsystem 120 includes a fan 202 operably coupled to the circuit board 204. Fan 202 may be configured such that the speed of the fan 202 is based on the duty cycle of a PWM signal. In one example, each of graphics processing unit 122 and graphics processing unit 124 may be configured to generate a respective PWM signal where a period and a duty cycle of a PWM signal are based on an internal temperature and/or a thermal threshold. In one example, each of graphics processing unit 122 and graphics processing unit 124 may be configured to increase the duty cycle and/or the period of a PWM signal as internal temperature increases and/or if a thermal threshold is exceeded.

Each of graphics processing unit 122 and graphics processing unit 124 may provide a PWM signal using a general purpose input/out (GPIO) pin. In one example, a GPIO that controls fan 202 may be an open drain output driver. Using an open drain output driver may allow multiple drivers on the same board trace to control fan 202 without electrical shorts. An open drain output driver may effectively logically AND the PWM signals of each of graphics processing unit 122 and graphics processing unit 124. In one example, fan 202 may be configured to operate according to an active low configuration, i.e., the fan will be on when a PWM signal is low.

Figure 3:
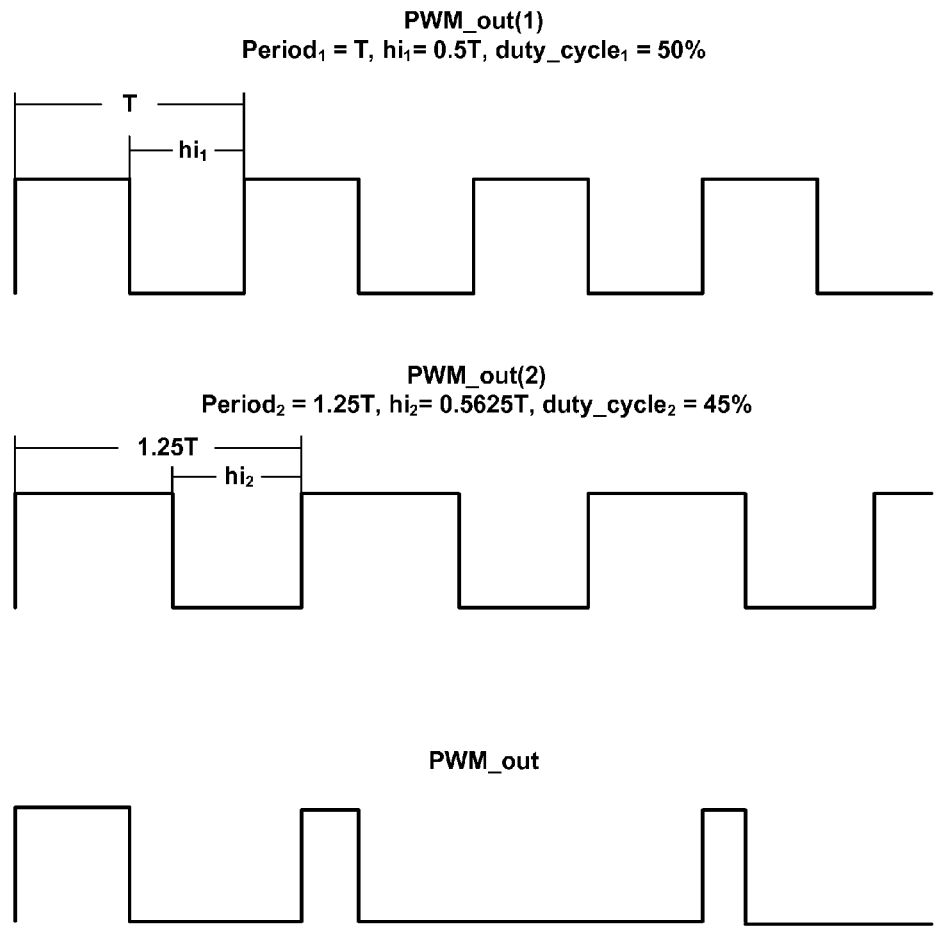
FIG. 3 is a conceptual diagram illustrating an example of control signals that may be used to control the speed of a fan according to one or more techniques of this disclosure.

FIG. 3 is a conceptual diagram illustrating an example of control signals that may be used to control a fan speed according to one or more techniques of this disclosure. In the example illustrated in FIG. 3, PWM_out(1) may correspond to a PWM signal generated by graphics processing unit 122 and PWM_out(2) may correspond to a PWM signal generated by graphics processing unit 124. In the example illustrated in FIG. 3, PWM_out may correspond to the logical AND of PWM_out(1) and PWM_out(2), which may drive fan 202 in an open drain configuration as described above.

In the example illustrated in FIG. 3, each of PWM_out(1) and PWM_out(2) are generated independently. That is, $period_1$, $hi_1$, and resulting $duty\_cycle_1$ may be based on the internal temperature of graphic processing unit 122 without consideration of PWM_out(2). In a similar manner, $period_2$, $hi_2$, and resulting $duty\_cycle_2$ may be based on the internal temperature of graphic processing unit 124 without consideration of PWM_out(1). In the example illustrated in FIG. 3, PWM_out(1) has a period of T and a duty cycle of 50% and PWM_out(2) has period of 1.25 T and a duty cycle of 45% based on an active low configuration. As a result of being generated independently, PWM_out(1) and PWM_out(2) may be asynchronous and have different periods, which may result in PWM_out not having a consistent duty cycle or period, as illustrated in FIG. 3. As described above, when a signal driving a fan does not have a consistent duty cycle and period, the fan 202 may oscillate between speeds, which may cause undesirable acoustic noise and/or a reduced cooling effect.

Figure 4:
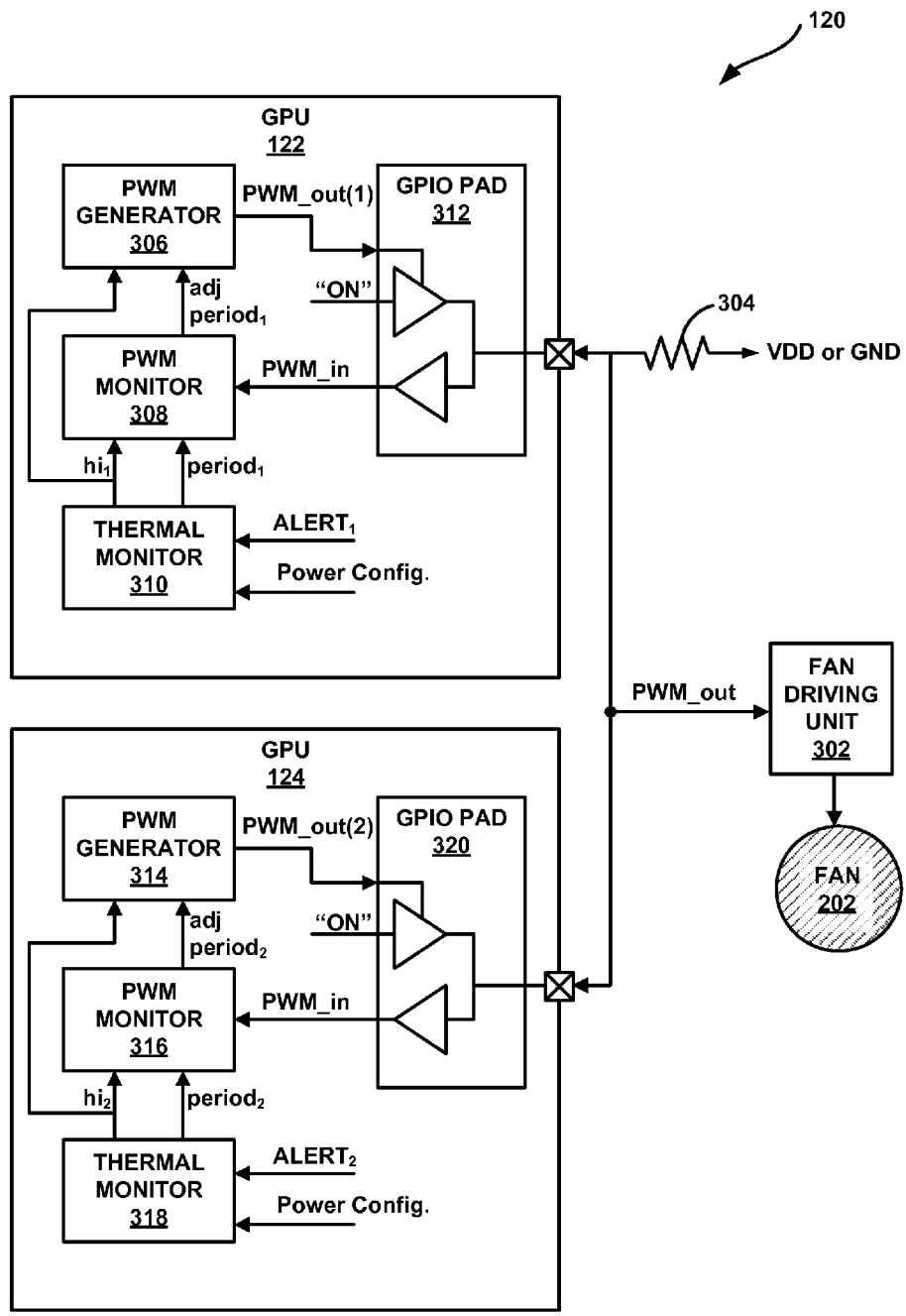
FIG. 4 is a block diagram illustrating an example of a graphics subsystem that may implement one or more techniques of this disclosure.

FIG. 4 is a block diagram illustrating an example of a graphics subsystem that may implement one or more techniques of this disclosure. In the example illustrated in FIG. 4, graphics subsystem 120 includes fan driving unit 302 and pull resistor 304. Further, as illustrated in FIG. 4, graphics processing unit 122 includes PWM generator 306, PWM monitor 308, thermal monitor 310, and GPIO pad 312 and graphics processing unit 124 includes PWM generator 314, PWM monitor 316, thermal monitor 318, and GPIO pad 320. Graphics subsystem 120 illustrated in FIG. 4 represents an example of a graphics subsystem that may be configured to control the speed of a fan based on respective fan control signals generated from one or more graphics processing units.

Fan driving unit 302 may be configured to receive a PWM signal and provide a signal for driving fan 202. In one example, fan driving unit 302 may include an open drain output driver and may include a MOSFET transistor that allows a driving current to flow through (and thus rotate) fan 202 when either of PWM_out(1) or PWM_out(2) is low. That is, PWM_out may correspond to the logical AND of PWM_out(1) and PWM_out(2). As illustrated in FIG. 4, PWM_out(1) and PWM_out(2) are respectively generated by PWM generator 306 and PWM generator 314. Each of PWM generator 306 and PWM generator 314 may be configured to generate a PWM signal based on signals received from respective thermal monitor 310 and thermal monitor 318. Pull resistor 304 may be coupled to a source voltage, VDD (for an open drain configuration), or ground, GND (for an open source configuration), and may be configured to pull fan driving unit 302 to an OFF state, when PWM_out is not driving fan 202.

As illustrated in FIG. 4, graphics processing unit 122 and graphics processing unit 124 respectively include thermal monitor 310 and thermal monitor 318. Each of thermal monitor 310 and thermal monitor 318 may be configured to sense an internal temperature of a graphic processing unit. Each of thermal monitor 310 and thermal monitor 318 may cause respective PWM generator 306 and PWM generator 314 to generate a PWM signal having a duty cycle and period that will drive fan 202 based on a desired cooling effect. Thermal monitor 310 and thermal monitor 318 may include internal logic to determine a desired period and a desired duty cycle based on a temperature measurement. In one example, each of thermal monitor 310 and thermal monitor 318 may cause fan 202 to rotate at a maximum speed if a thermal threshold is exceeded. In one example, a "maximum" speed may correspond to a speed that achieves a maximum cooling effect at an acoustic level that does not degrade the user experience. In the example illustrated in FIG. 4, each of $ALERT_1$ and $ALERT_2$ respectively correspond to the thermal thresholds of graphics processing unit 122 and graphics processing unit 124. Each of $ALERT_1$ and $ALERT_2$ may be programmable, e.g., based on a performance operating mode. Generating a PWM signal based on a thermal threshold is intended to serve as a failsafe to prevent GPU core temperatures from reaching a critical threshold.

As further illustrated in FIG. 4, each of thermal monitor 310 and thermal monitor 318 receive power configuration information (Power Config). Power configuration information may include information that allows thermal monitor 310 and thermal monitor 318 to determine a duty cycle and a period of a PWM that will achieve a desired cooling effect. In one example, power configuration information may include duty cycle and period values stored in one or more configuration registers (not shown). In one example, upon graphics processing unit 122 and graphics processing unit 124 being powered up, straps may be sensed to configure the initial PWM duty cycle. That is, a voltage may be measured to initially determine $period_1$, $hi_1$, and $period_2$, $hi_2$. Further, a thermal management system of graphics system 120, which may include software, may reconfigure the PWM settings once a graphics processing core of graphics processing unit 122 and graphics processing unit 124 are powered up and running.

As described above, a desired duty cycle may be defined according to the following equations:

period: desired number of clock cycles of the PWM waveform period (1)

hi: desired number of clock cycles to drive the PWM to spin the fan (2)

duty cycle=hi/period (3)

As illustrated in FIG. 4, each of PWM generator 306 and PWM 314 receive respective hi values, $hi_1$ and $hi_2$, and respective period values, adj. period$_1$ and adj. period$_2$ and output respective PWM signals, PWM_out(1) and PWM_out(2), where PWM_out(1) and PWM_out(2) respectively have a duty cycle determined according to $hi_1$ and adj. period$_1$, $hi_2$, and adj. period$_2$. As described in detail below, adj. period$_1$ and adj. period$_2$ may be adjusted values of period$_1$ and period$_2$ as determined by PWM monitor 308 and PWM monitor 316. As described above and illustrated with respect to FIG. 3, when multiple GPUs provide PWM signals for driving a fan, techniques for combining the PWM signals may result in excess acoustic noise that may degrade the user experience. As further described above, in some cases a GPU may be in a power state that prevents the GPU from generating a PWM signal.

As illustrated in FIG. 4, graphics processing unit 122 and graphics processing unit 124 respectively include PWM monitor 308 and PWM monitor 316. Each of PWM monitor 308 and PWM monitor 316 may be configured to monitor the signal provided to fan driving unit 302 (i.e., PWM_out) and adjust the PWM signal generated by its graphics processing unit. In one example, one or both of PWM_out(1) and PWM_out(2) may be modified such that the resulting PWM signal provided to fan driving unit 302 (PWM_out) has a desired duty cycle. In one example, each of PWM generator 306, PWM monitor 308, PWM generator 314 and PWM monitor 316 may be configured as always-on power island(s). In one example, each of PWM generator 306, PWM monitor 308, PWM generator 314 and PWM monitor 316 may be powered independent of GPU core resets, GPU core power states, and power states associated with graphics processing unit 122 and graphics processing unit 124. Further, each of PWM generator 306, PWM monitor 308, PWM generator 314, and/or PWM monitor 316 may be configured such that when graphics processing unit 122 and graphics processing unit 124 and/or GPU cores thereof are reset or powered off, PWM generator 306, PWM monitor 308, PWM generator 314 and/or PWM monitor 316 maintains the speed of fan 202. In this manner, graphics subsystem 120 may be configured to maintain a fan speed independent of the power state of one or more graphics processing units.

As described above, each of PWM monitor 308 and PWM monitor 316 may monitor PWM_out and respectively adjust PWM_out(1) and PWM_out(2) such that the resulting PWM_out has a desired duty cycle. In the example illustrated in FIG. 4, PWM generator 306 provides a PWM signal, PWM_out(1), to GPIO PAD 312 and PWM generator 314 provides a PWM signal, PWM_out(2), to GPIO PAD 320. As illustrated in FIG. 4, each of GPIO PAD 312 and GPIO PAD 320 include an input buffer and an output buffer. In the example illustrated in FIG. 4, each of graphics processing unit 122 and graphics processing unit 124 control the same board trace for fan control and output buffers are configured for open drain operation. Thus, in the example illustrated in FIG. 4, each of PWM monitor 308 and PWM monitor 316 may monitor its respective input buffer (i.e., PWM_in) to sense what the other graphic processing unit is driving on the board trace (PWM_out). That is, PWM_in may follow PWM_out and PWM_out may equal the logic AND of all the PWM signals (e.g., PWM_out(1) & PWM_out(2) . . . & PWM_out (n)). Thus, PWM monitor 308 can compare PWM_out(1) to PWM_in to determine characteristics of PWM_out(2). Likewise, PWM monitor 316 can compare PWM_out(2) to PWM_in to determine characteristics of PWM_out(1).

In one example, each of PWM monitor 308 and PWM monitor 316 may measure the time that a PWM signal is asserted, where an asserted signal causes fan 202 to spin faster. In one example described below, each of PWM monitor 308 and PWM monitor 316 may measure the time that a PWM signal is asserted by monitoring PWM_in. Based on the measured time, each of PWM monitor 308 and PWM monitor 316 may respectively cause graphics processing unit 122 and graphics processing unit 124 to adjust its PWM period (e.g., by waiting to assert is signal based on a total assertion time) to maintain a desired duty cycle. In this manner the resultant PWM signal may naturally implement a maximum function of the duty cycles from graphics processing unit 122 and graphics processing unit 124. Further, each of PWM monitor 308 and PWM monitor 316 may respectively cause each of graphics processing unit 122 and graphics processing unit 124 to de-assert its PWM signal until its PWM period has expired or until it senses that the PWM signal is asserted, at which point it may assert the PWM signal for the assertion time it is configured for. In this manner the resultant PWM signals may by synchronized.

Figure 5:
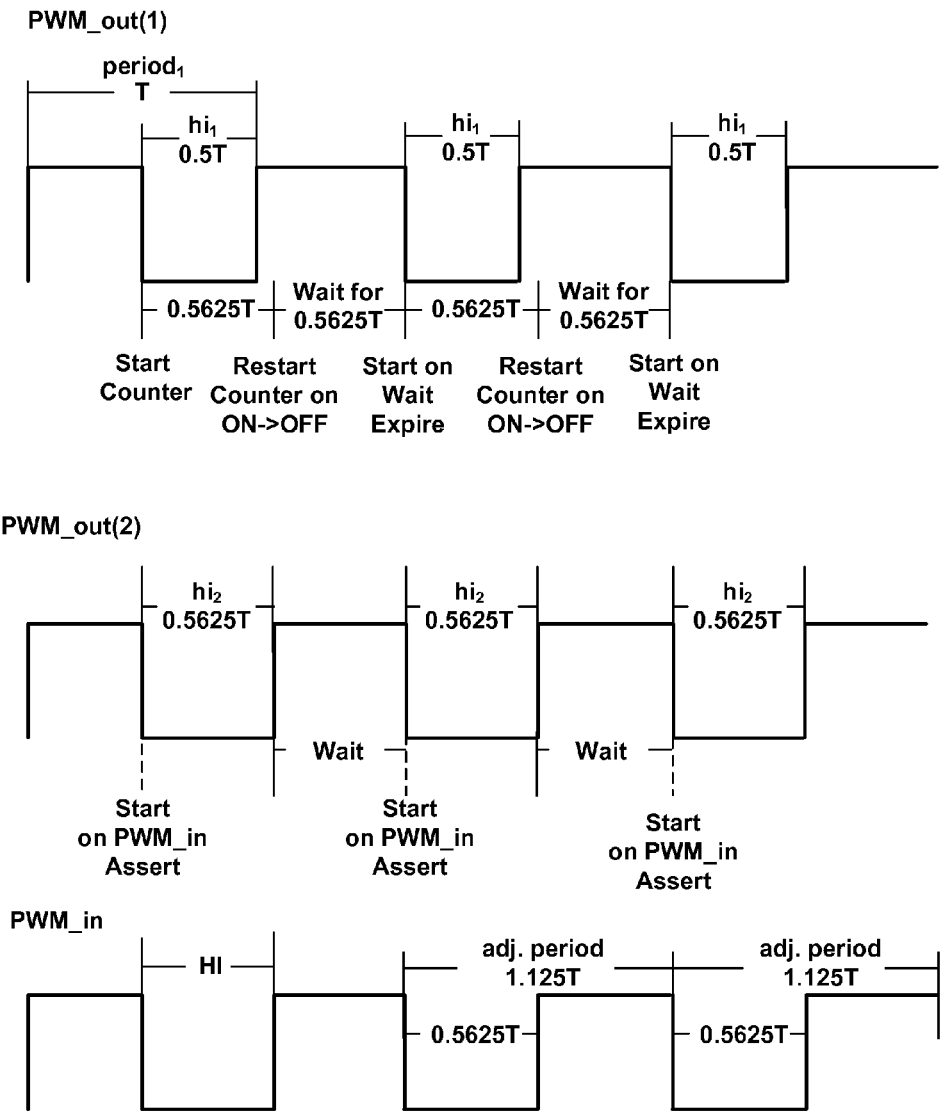
FIG. 5 is a conceptual diagram illustrating an example of control signals that may be used to control a fan speed according to one or more techniques of this disclosure.

FIG. 5 is a conceptual diagram illustrating an example of control signals that may be used to control a fan speed according to one or more techniques of this disclosure. Similar to the example illustrated in FIG. 3, in the example illustrated in FIG. 5 each of PWM_out(1) and PWM_out(2) may be respectively be based on $hi_1$, $hi_2$, period$_1$, and period$_2$. However, as described in detail below, each of PWM_out(1) and PWM_out(2) may be adjusted such that PWM_out has a desired duty cycle. In the example illustrated in FIG. 5, PWM_out(1) initially has a period of T as defined by period$_1$, but is adjusted from T to 1.125 T based on PWM_in. Further, in the example illustrated in FIG. 5 PMW_out(1) and PWM_out(2) are synchronized. That is, in the example described with respect to FIG. 5, PWM_out(1) starts its assert, $hi_1$, based on the length of time PWM_out(2) has been asserted and PWM_out(2) starts its assert, $hi_2$, based on when PWM_out(1) is asserted. It should be noted that in the example illustrated in FIG. 5, PWM_in may represent an ideal case where PWM_in equals PWM_out. That is, for the sake of clarity, delays between PWM_in and PWM_out are not illustrated in FIG. 5.

In one example, each of PWM monitor 308 and PWM monitor 316 may be configured to include logic implemented as any combination of hardware, firmware and/or software to respective adjust PWM_out(1) and PWM_out(2) based on the following algorithm:

---
START
    // initial state
    pwm_out = OFF;
    clock_counter = 0;

```
        // turn the fan on
        pwm_out = ON;
        while (clock_counter <= hi) {
            clock_counter++
        }
        pwm_out = OFF;
        // Wait for the ON->OFF transition
        // It will occur immediately if no other GPUs are driving the PWM
        signal,
        // but could occur later if the other GPUs have a longer hi time
configuration.
        while (pwm_in == ON) {
            clock_counter++
        }
        // Recompute period such that the PWM duty cycle will match
        // what is configured by hi and period.
        // Note that clock_counter holds the actual time the fan was ON.
        // Note that clock_counter will be greater than or equal to hi.
        // This will cause the adjusted period to be greater than or equal
        // to the configured period.
        adjusted_period = clock_counter * period / hi;
        // Wait until the adjusted PWM period expires or until another
        // GPU starts driving the fan.
        while ((pwm_in == OFF) && (clock_counter <= adjusted_period))
        {
            clock_counter++
        }
        // start over with new PWM period
        goto START
END
```

An example execution of the algorithm above by PWM monitor 308 and PWM monitor 316 is illustrated in FIG. 5. It should be noted that although the example illustrated in FIG. 5 is described as being performed by two PWM monitors, the algorithm above may be continuously performed by any number PWM monitors. Further, it should be noted that each of PWM monitor 308 and PWM monitor 316 may be configured such that the algorithm above is applied for non-static PWM waveforms. That is, each of PWM monitor 308 and PWM monitor 316 may first check whether a PWM signal has a duty cycle of 0% or 100% and disregard this as a degenerate case and not apply the algorithm.

In the algorithm above, period may be the desired number of clock cycles of the PWM waveform period and hi may be the desired number of clock cycles to drive the PWM to spin the fan. As illustrated in FIG. 5, PWM_out(1) initially has a period of T and a hi time of 0.5 T, each of which may be defined by thermal monitor 310, which results in a defined duty cycle of 50% (i.e., 0.5 T/T=50%). In the example illustrated in FIG. 5, PWM_out(2) has a defined period of 1.25 T and a hi time of 0.5625, which results in a defined duty cycle of 45% (i.e., 0.5625 T/1.25 T=45%).

As illustrated in FIG. 5, PWM monitor 308 starts a counter when PWM_out(1) is asserted. The assertion of PWM_out(1) causes PWM monitor 316 to assert PWM_out(2) according to the final while condition in the algorithm above. Similar to PWM monitor 308, PWM monitor 316 also starts a counter when PWM_in is asserted based on the assertion of PWM_out(1). As illustrated in FIG. 5, PWM monitor 308 keeps incrementing its counter until PWM_in transitions to OFF, which is caused by $hi_2$ expiring after 0.5625 T. Based on the counter value of 0.5625 T, PWM monitor 308 can calculate an adjusted period of 1.125 T (0.5625*T/0.5 T) and wait 0.5625 T before asserting PWM_out(1) in order to maintain a desired duty cycle of 50%. Likewise PWM monitor 316 can calculate an adjusted period of 1.25 T and wait 0.6875 T before asserting PWM_out(2) in order to maintain its defined duty cycle of 45%. However, because 0.5625 T is shorter than 0.6875 T, PWM monitor 316 will cause PWM_out(2) to be asserted at 0.5625 T according to the "PWM period expires or until another GPU starts driving the fan" condition above.

As illustrated in FIG. 5, the resulting PWM_in signal, which corresponds to PWM_out has a duty cycle of 50% and an adjusted period of 1.125 T. In this manner, graphics subsystem 120 may be configured to monitor multiple PWM signals and generate a PWM signal having a duty cycle equal to the maximum duty cycle of individual duty cycles of received PWM signals. That is, given that each of a plurality of graphic processing units, GPU(i), is configured to generate a PWM waveform having duty_cycle(i) and period(i), graphics subsystem 120 may be configured to generate a signal have a resultant DUTY_CYCLE and PERIOD defined as follows:

DUTY_CYCLE=max(duty_cycle(0), duty_cycle(1), . . . , duty_cycle(i))

Figure 6:
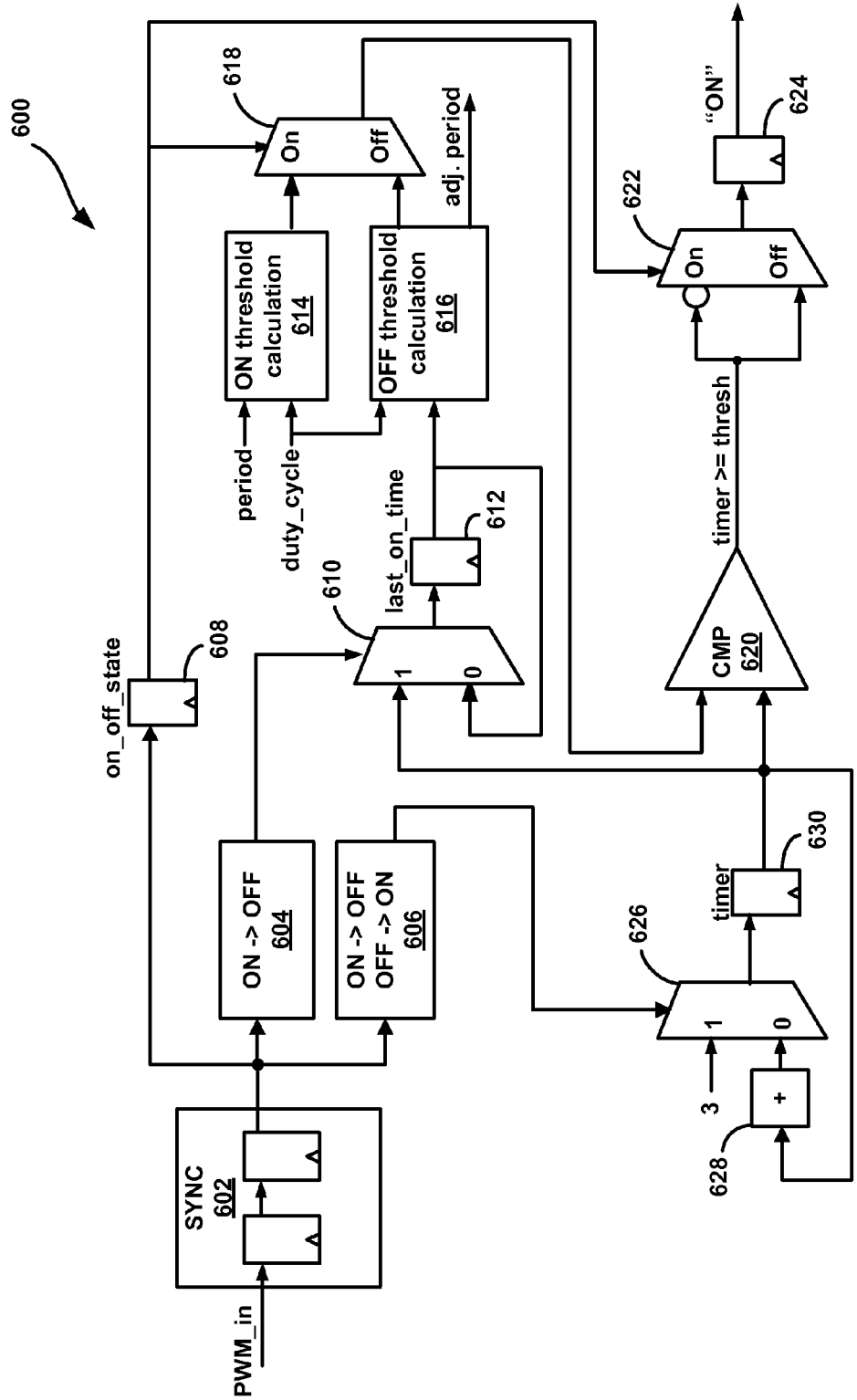
FIG. 6 is a block diagram illustrating an example of a monitoring device that may implement one or more techniques of this disclosure.

PERIOD=max(period(0)*duty_cycle(0), period(1)*duty_cycle(1), . . . , period(i)*duty_cycle(i))/DUTY_CYCLE FIG. 6 is a block diagram illustrating an example of a monitoring device that may implement one or more techniques of this disclosure. As described above, each of PWM monitor 308 and PWM monitor 316 may be configured to adjust the period of a fan control signal and synchronize a fan control signal with other fan control signals. FIG. 6 illustrates one example implementation of a PWM monitor that may be configured to adjust the period of a fan control signal and synchronize a fan control signal with other fan control signals.

As illustrated in FIG. 6, PWM monitor 600 includes SYNC unit 602, ON-to-OFF detection unit 604, ON-to-OFF or OFF-to-ON detection unit 606, on_off_state unit 608, multiplexer 610, last_time_on state unit 612, ON threshold calculation unit 614, OFF threshold calculation unit 616, multiplexer 618, comparator 620, multiplexer 622, output unit 624, multiplexer 626, incrementing unit 628, and timer 630. PWM monitor 600 is configured such that incoming PWM signal, PWM_in, is monitored and internal timing components are synchronized to OFF/ON transitions and outgoing "ON," which causes a PWM_out signal to be seen on a GPIO PAD, (e.g., GPIO PAD 312, as illustrated in FIG. 4) is generated based on the synchronized timing components and the ON thresholds and OFF thresholds. Further, PWM monitor 600 is configured to generate an adjusted period value based on the algorithm provided above.

As illustrated in FIG. 6, SYNC unit 602 receives PWM_in signal and provides a synchronized PWM_in signal to ON-to-OFF detection unit 604, ON-to-OFF or OFF-to-ON detection unit 606, and on_off_state unit 608. On_off_state unit 608 stores a value indicating whether PWM_in is in an ON state or an OFF state. As illustrated in FIG. 6, the output of on_off_state unit 608 is provided to multiplexer 618. Multiplexer 618 outputs an ON threshold value to comparator 620 if PWM_in is in an ON state and outputs an OFF threshold value to comparator 620 if PWM_in is in an OFF state.

ON-to-OFF detection unit 604 detects whether an ON-to-OFF transition occurs in PWM_in. As illustrated in FIG. 6, the output of ON-to-OFF detection unit 604 is provided to multiplexer 610. Multiplexer 610 outputs either the output of timer 630 or the output of last_time_on state unit 612 based whether an ON-to-OFF transition is detected. The value output by last_time_on state unit 612 is provided to OFF threshold calculation unit 616 to calculate an OFF threshold value. That is, multiplexer 610 and last_time_on state unit 612 allow OFF threshold calculation unit 616 to determine how long PWM_in has been in an ON state. As illustrated in FIG. 6, OFF threshold calculation unit 616 also receives a duty cycle value. The duty cycle and period value illustrated in FIG. 6 may correspond to defined period and defined hi values described above (duty cycle=hi/period). In one example, OFF threshold calculation unit 616 can calculate an OFF threshold according to the following equation:

$$OFF\_threshold = last\_time\_on * (1 - duty\_cycle) / duty\_cycle$$

Further, OFF threshold calculation unit 616 can calculate the adjusted period value according to the following equation:

$$adj.\ period = last\_time\_on + OFF\_threshold$$

As illustrated in FIG. 6, ON threshold calculation unit 614 may receive the duty cycle and period value. ON threshold calculation unit 614 may be configured to calculate an ON threshold value based on the duty cycle and period values. In one example, ON threshold calculation unit 614 may calculate an ON threshold according to the following equation:

$$ON\_threshold = period * duty\_cycle$$

As described above, the actual ON time may be greater than the ON time driven by a GPU, so the OFF threshold is calculated based on the last ON time and the targeted duty cycle. As described above, this may extend the desired period, but it should not be shorter than the desired period.

ON-to-OFF or OFF-to-ON detection unit 606 may be configured to load timer 630 with an initial value when an ON or OFF transition is detected using multiplexer 626. In the example, illustrated in FIG. 6, timer 630 may be loaded with the value 3 and incremented thereafter using incrementing unit 628. The initial value may be chosen to match the latency from driving PWM_out to detecting PWM_in. It should be noted that timer 630 is different that clock counter described in the algorithm above. That is, as described timer 630 operates in conjunction with other components of PWM monitor 600 to determine counter values in the algorithm above.

Comparator 620 compares a timer value to an ON threshold or an OFF threshold. The result of comparator 620 may be used to drive PWM_out. That is, multiplexer 622 and output unit 624 may cause PWM_out to enter either an ON or OFF state when timer is greater than a threshold value. It should be noted that the implementation of PWM monitor 600 in FIG. 6 may be a suitable implementation in the case where the duty cycle values take on limited and discrete values, such as when the OFF and ON percentages are power of 2 integer multiples of each other. If this is not the case, other implementations may be more suitable, such as an ON time credit accumulator which drains when PWM_out is off. As described above, the GPIO that controls a fan may be an open drain output driver. In one example, the ON time may be extended because the one graphics processing unit is driving the GPIO to ground. However, in the example illustrated in FIG. 6, the ON time may be configured such that it cannot be cut short by another graphics processing unit.

Figure 7:
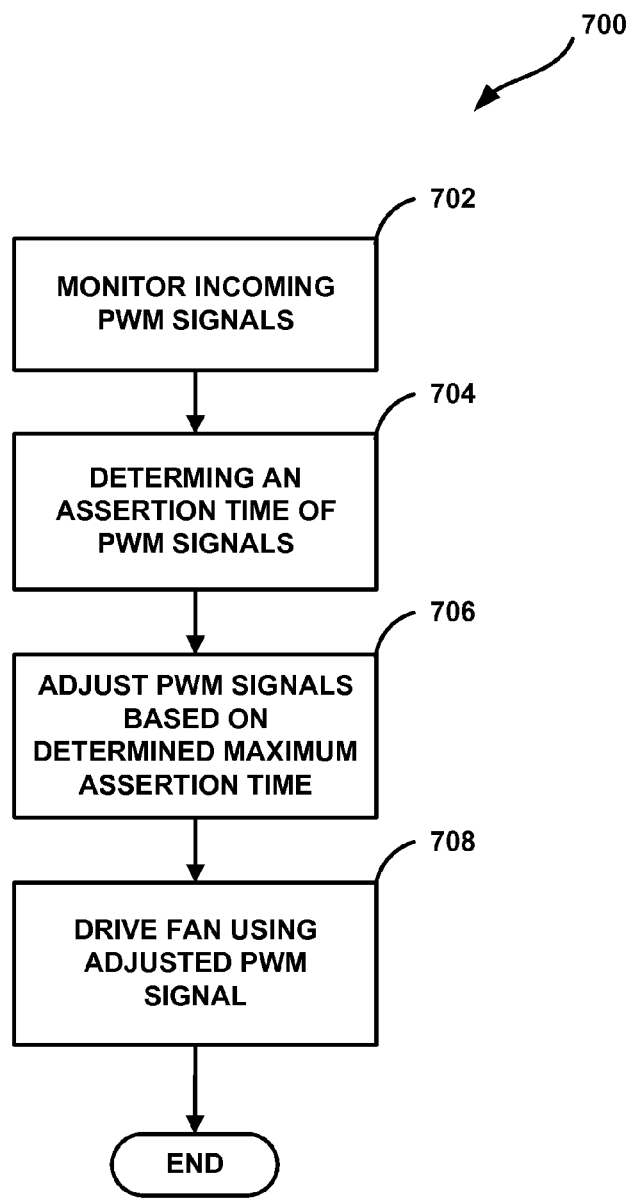
FIG. 7 is a flowchart illustrating an example method for controlling fan speed according to the techniques of this disclosure.

FIG. 7 is a flowchart illustrating an example method for controlling fan speed according to the techniques of this disclosure. Although method 700 is described with respect to PWM monitor 600, method 700 may be performed by any combination of components of computing device 100. PWM monitor 600 monitors a signal driving a fan (702). PWM monitor 600 determines an assertion time of the signal driving the fan (704). PWM monitor 600 determines whether an assertion time of the signal driving the fan is greater than an assertion time of the generated fan control signal. PWM monitor 600 adjusts the generated fan control signal based on whether the assertion time of the signal driving the fan is greater than the assertion time of the generated fan control signal (706). PWM monitor 600 causes the adjusted signal to be output to drive the fan. In this manner PMW monitor 600 represents an example of a device configured to control the speed of a fan associated with a graphics processing subsystem.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for controlling the speed of a fan associated with a graphics processing subsystem, the method comprising:
monitoring a drive signal driving a fan;
comparing the drive signal driving the fan to a defined period and a defined duty cycle of a generated fan control signal;
determining whether an assertion time of the drive signal driving the fan is greater than an assertion time of the generated fan control signal; and
adjusting the generated fan control signal based on whether the assertion time of the drive signal driving the fan is greater than the assertion time of the generated fan control signal.

2. The method of claim 1, wherein the drive signal driving the fan is a result of a logical AND operation of the generated fan control signal and one or more additional generated fan control signals.

3. The method of claim 1, wherein the assertion time of the generated fan control signal is the product of the defined period and the defined duty cycle.

4. The method of claim 1, wherein adjusting the generated fan control signal includes extending the period of the generated fan control signal to maintain the defined duty cycle.

5. The method of claim 1, wherein adjusting the generated fan control signal includes synchronizing the generated fan control signal with the drive signal driving the fan.

6. The method of claim 1, wherein the generated fan control signal is generated by a graphics processing unit.

7. The method of claim 6, wherein the defined period and defined duty cycle are determined based on a temperature measurement of the graphics processing unit.

8. The method of claim 6, wherein the defined period and defined duty cycle are initialized based on a measured voltage when the graphics processing unit is powered on.

9. A device for processing graphics data, the device comprising:
a fan;
a plurality of graphics processing units configured to:
generate a fan control signal based on a defined period and a defined duty cycle;
monitor a drive signal driving the fan;
compare the drive signal driving the fan to the defined period and defined duty cycle of the generated fan control signal;
determining whether an assertion time of the drive signal driving the fan is greater than an assertion time of the generated fan control signal; and
adjust the generated fan control signal based on whether the assertion time of the drive signal driving the fan is greater than the assertion time of the generated fan control signal.

10. The device of claim 9, wherein the drive signal driving the fan is a result of a logical AND of respective generated fan control signals.

11. The device of claim 9, wherein adjusting the generated fan control signal includes extending a period of the fan control signal based on the drive signal driving the fan.

12. The device of claim 9, wherein adjusting the generated fan control signal includes synchronizing the generated fan control signal with the drive signal driving the fan.

13. The device of claim 9, wherein the defined period and the defined duty cycle are determined based on a temperature measurement of the graphics processing unit.

14. The device of claim 9, wherein the defined period and defined duty cycle are initialized based on a measured voltage when the graphics processing unit is powered on.

15. A method for controlling the speed of a fan associated with a graphics processing subsystem, the method comprising:
monitoring a plurality of fan control signals;
generating a signal having a duty cycle equal to the maximum duty cycle of the plurality of fan control signals, wherein a period of the generated signal is adjusted to be equal to a maximum assertion time of the plurality of fan control signals divided by a maximum duty cycle of the plurality of fan control signals;
and driving the fan using the adjusted generated signal.

16. The method of claim 15, wherein monitoring a plurality of fan control signals includes monitoring a result of a logical AND of the plurality of fan control signals.

17. The method of claim 15, wherein generating a signal having a duty cycle equal to the maximum duty cycle includes adjusting one or more of the plurality of fan control signals.

18. The method of claim 15, wherein each of the plurality of fan control signals is generated by a graphics processing unit based on a temperature of the graphics processing unit.

19. The method of claim 18, further comprising generating a fan control signal in the event the graphics processing unit is powered down.

* * * * *